(12) United States Patent
Albaugh

(10) Patent No.: US 6,874,971 B2
(45) Date of Patent: Apr. 5, 2005

(54) CONNECTOR FOR TUBE AND CONNECTED TUBULAR STRUCTURE

(75) Inventor: Harold Albaugh, Naperville, IL (US)

(73) Assignee: Freeman Capital Company, Las Vegas, NV (US)

(*) Notice: Subject to any disclaimer, the term of this patent is extended or adjusted under 35 U.S.C. 154(b) by 22 days.

(21) Appl. No.: 10/614,020

(22) Filed: Jul. 8, 2003

(65) Prior Publication Data

US 2005/0008431 A1 Jan. 13, 2005

(51) Int. Cl.[7] .............................................. F16B 2/14
(52) U.S. Cl. ..................................... 403/297; 403/368
(58) Field of Search ........................... 403/297, 374.1, 403/367–368; 411/79–80, 55

(56) References Cited

U.S. PATENT DOCUMENTS

| 3,437,362 A | * | 4/1969 | Offenbroich ................ 403/297 |
| 3,462,021 A | | 8/1969 | Hawke et al. |
| 3,462,893 A | * | 8/1969 | Kaiser .................... 403/297 X |
| 3,484,830 A | * | 12/1969 | Wagner et al. .......... 403/297 X |
| 3,620,558 A | | 11/1971 | MacMillan |
| 3,753,583 A | | 8/1973 | Offenbroich |
| 4,291,999 A | | 9/1981 | Vandelanoite |
| 4,893,958 A | | 1/1990 | Wieland |
| 5,219,449 A | | 6/1993 | Hoshino |
| 5,503,492 A | | 4/1996 | Stevens et al. |
| 6,062,761 A | | 5/2000 | Allen |
| 6,203,239 B1 | | 3/2001 | Mucciaccciaro et al. |
| 6,408,587 B2 | | 6/2002 | Cronin et al. |
| 2003/0063949 A1 | * | 4/2003 | Hohenocker ................ 403/367 |

* cited by examiner

Primary Examiner—John R. Cottingham
(74) Attorney, Agent, or Firm—Shlesinger, Arkwright & Garvey LLP

(57) ABSTRACT

A connector for connecting lengths of tubing in an end to end relation, the connector comprises a central body comprising first and second cooperating members operatively associated with a mechanism for moving the cooperating members in a direction transverse to the longitudinal axis of the connector and wedge members, the wedge members surrounding the central body and resting against the central body so that when the cooperating members are caused to move apart, the wedge members are urged outwardly to uniformly engage the interior of a tube to be connected.

20 Claims, 4 Drawing Sheets

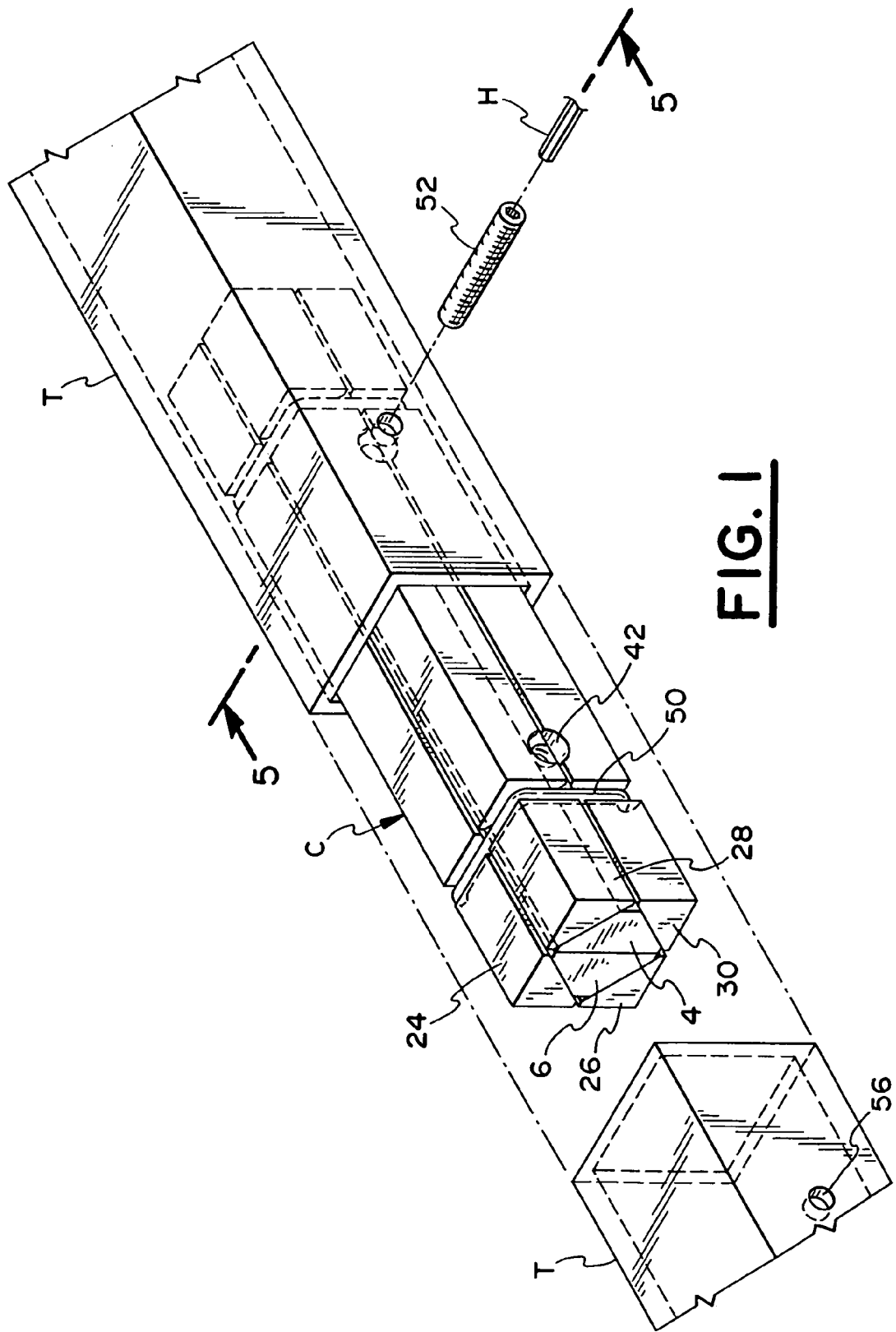

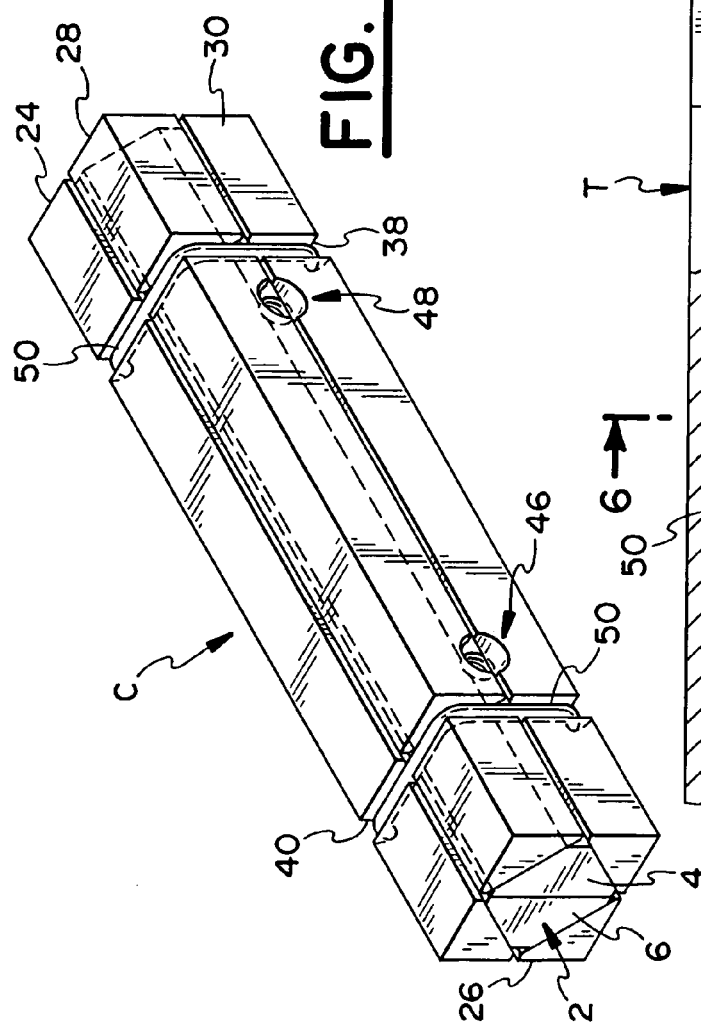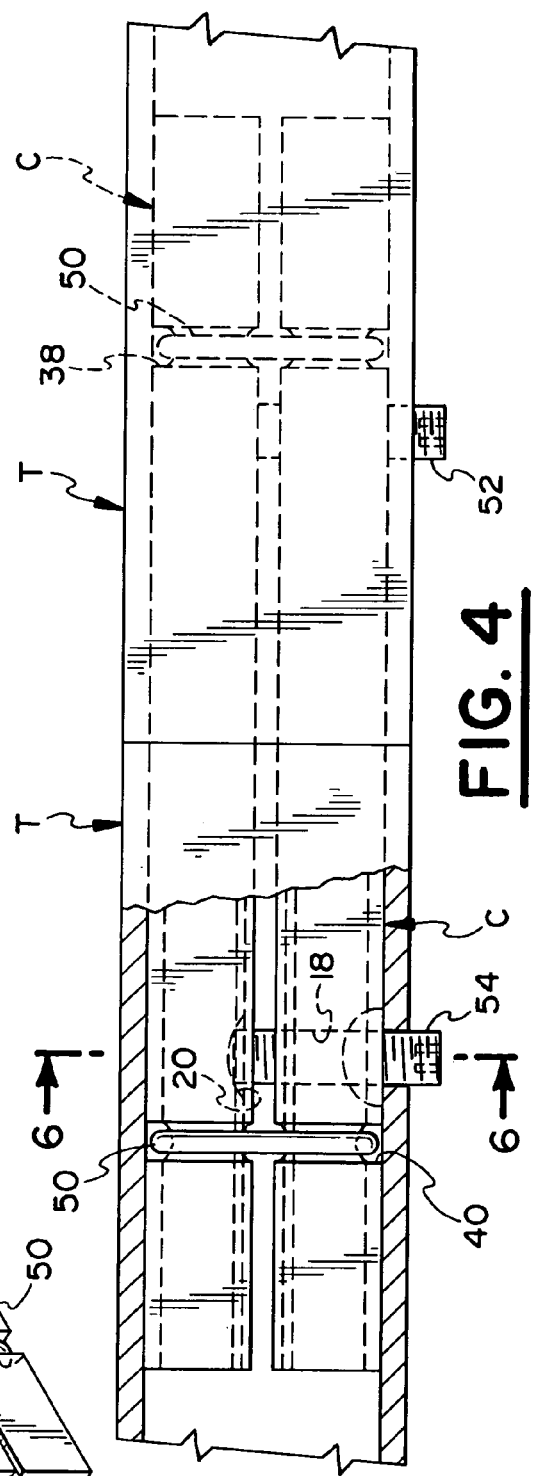

CONNECTOR FOR TUBE AND CONNECTED TUBULAR STRUCTURE

FIELD OF THE INVENTION

The present invention relates to a connector and in particular, a connector for interconnecting the ends of adjacent lengths of tubing and a structural member formed from interconnected tubing and the connector.

BACKGROUND AND SUMMARY OF THE INVENTION

Structures formed from interconnected lengths of tubing are known. For example, tubing may be variously connected to provide a temporary modular structure for supporting a sign or a banner. It is advantageous if the lengths of tubing are easily interconnected and provide a structure that is rigid and adapted to be readily disassembled for later reuse.

A frequent problem is that repeated assembly and disassembly of the tubing causes wear to the structural components. In particular, a connector inserted within and then removed from the ends of the tubes causes wear to the interior of the tube. Eventually, the wear to the interior of the tube becomes so great that the connector cannot compensate for variances in wall thickness and a rigid connection with the tube is no longer possible. Variances in tube thickness may also result during manufacture and similarly contribute to a connection problem. Even small differences in the thickness of tube to be connected can result in a poor connection and insufficient rigidity of the interconnected structure.

Expandable connectors adapted to be inserted within the interior of adjacent tubes are known however these devices are not satisfactory. In particular, these devices do not provide a high degree of surface contact between the connector and the interior of the tube to be connected and only provide contact at discrete locations. As is apparent, such connections do not result in a sturdy and rigid connection along the entire surface area of the connector. Second, the prior art connectors are designed to bite into the interior wall of the tube thereby resulting in excessive wear to both the connector and the tube wall. Third, expandable prior art connectors do not apply contact pressure against the tube in a uniform manner. This results in a less than rigid connection and causes uneven wear to the connected tube.

In view of the above, the present invention provides a connector for tubing adapted to compensate for wear or variances in thickness of the tubing wall and to provide a circumferentially uniform contact force against the tube being connected as well as to provide a large surface area of contact between the connector and the tube. In addition, the connector of the present invention has an uncomplicated design providing a reliable connector that is easily disassembled for servicing or repair.

In summary, the present invention is directed to a connector for tubing comprising a central body having a longitudinal axis extending from a first end to a second end, the central body comprising first and second cooperating members, an expansion mechanism for selectively moving the first and second cooperating members in a direction transverse to the longitudinal axis of the central body and at least first and second wedge members surrounding the central body in an equidistant manner and resting against the central body from about the first end to the second end so that when the first and second cooperating members are moved apart by the expansion mechanism, the wedge members are urged in a direction outwardly from the central body along the longitudinal axis thereof to engage against the interior of a tube to be connected.

BRIEF DESCRIPTION OF THE DRAWINGS

FIG. 1 is perspective view showing the connector of the present invention and two sections of tubing to be connected;

FIG. 2 is a perspective view of the connector according to the present invention without the adjustment and locking screws;

FIG. 4 is a top plan view of the connector according to the present invention interconnecting two sections of tubing with a portion of one of the tubes broken away;

DETAILED DESCRIPTION OF THE PREFERRED EMBODIMENTS

Figure 3:
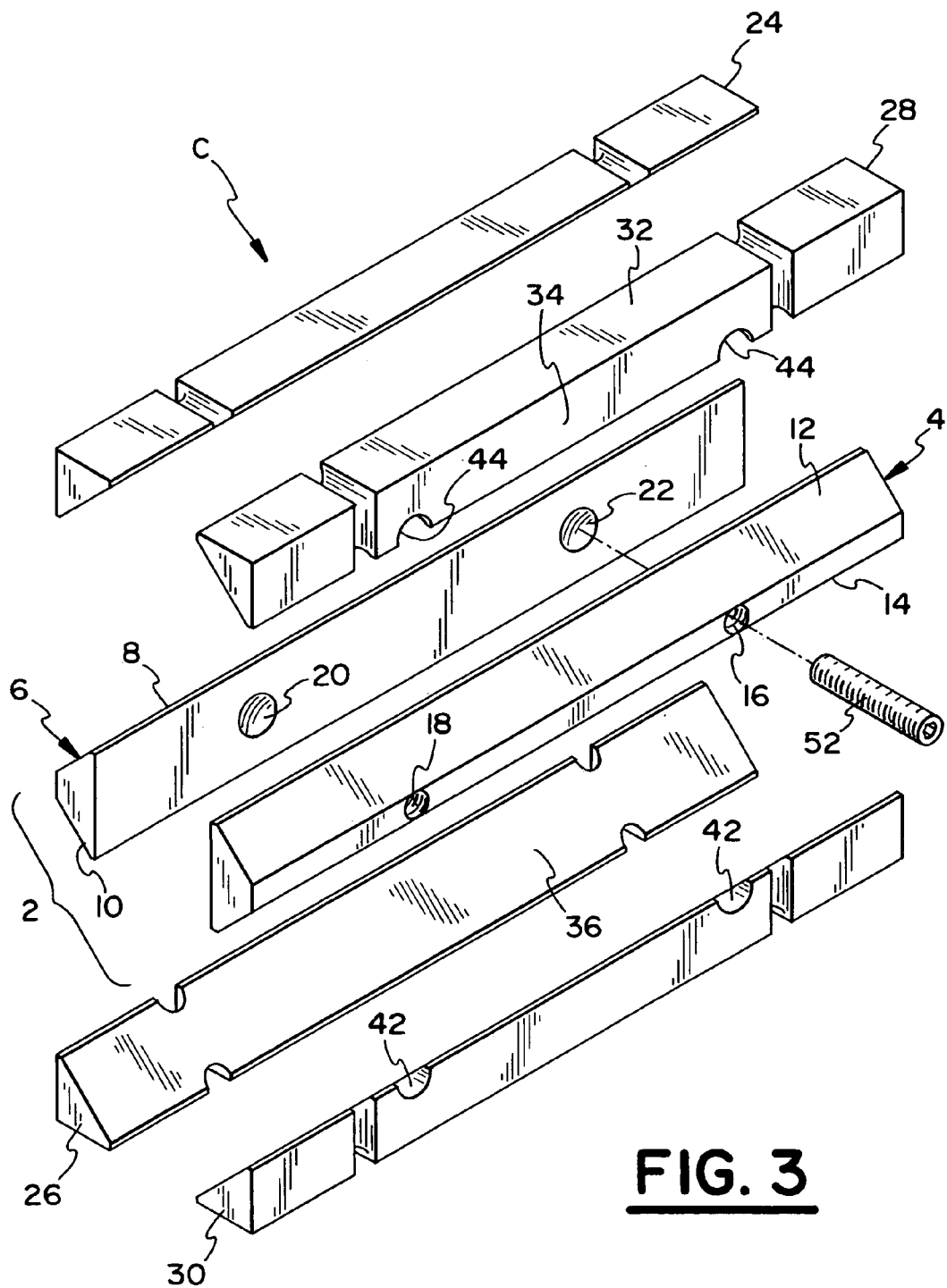
FIG. 3 is a exploded view of the connector according to the present invention.

The connector C of the present invention is shown in FIGS. 2 and 3 and in FIGS. 1 and 4 with two sections of tubing T. Connector C is adapted to be inserted within the interior of adjacent sections of tubing T to connect the tubing in a manner as will be explained below.

The connector C includes a central portion or body 2. The central body 2 comprises two cooperating members 4 and 6 shown to be mirror images of each other. Each of the cooperating members 4 and 6 have a generally wedge shaped cross-section and in at least one embodiment, the wedge shaped cross-section is an isosceles trapezoid. Central body 2 is provided with four cam surfaces 8, 10, 12 and 14. Cam surfaces 8 and 10 are associated with cooperating member 6 and cam surfaces 12 and 14 are associated with cooperating member 4.

Cooperating member 6 includes threaded passageways 16 and 18 that extend through the interior of the cooperating member 6. Threaded passageways 16 and 18 are coaxially aligned with concave regions or portions 20 and 22 provided on cooperating member 4.

Wedge members 24, 26, 28 and 30 surround central body 2 in an equidistant manner and rest against the central body along central body cam surfaces 8, 10, 12 and 14 respectively. Each of the wedge members are shown to have a generally triangular cross-section shape defining exterior contact surfaces. For example, in FIG. 3 wedge member 28 is shown to include exterior contact surfaces 32 and 34. The remaining wedge members are provided with similar contact surfaces. Each of the wedge member are also shown to include an interior contact surface. For example, in FIG. 3 wedge member 26 is shown to include an interior contact surface 36 that rests against central body 2. The remaining wedge members are provided with similar interior contact surfaces.

As best shown in FIG. 3, each wedge member is provided with a channel section coextensive with the channel section of an adjacent wedge member so that connector C includes first and second channels 38 and 40 (FIGS. 2 and 4) disposed at opposite ends of the connector C. An elastomeric O-ring 50 (FIGS. 1, 2 and 4) is fitted within each of the first and second channels 38 and 40 to maintain the wedge members in contact and alignment with central body 2 and the entire connector in an assembled position. Wedge members 28 and 30 are provided with widened regions 44 and 42 that cooperate to provide open regions 46 and 48 through which the threaded screws 52 and 54 of the connector C will respectively pass.

Figure 5:
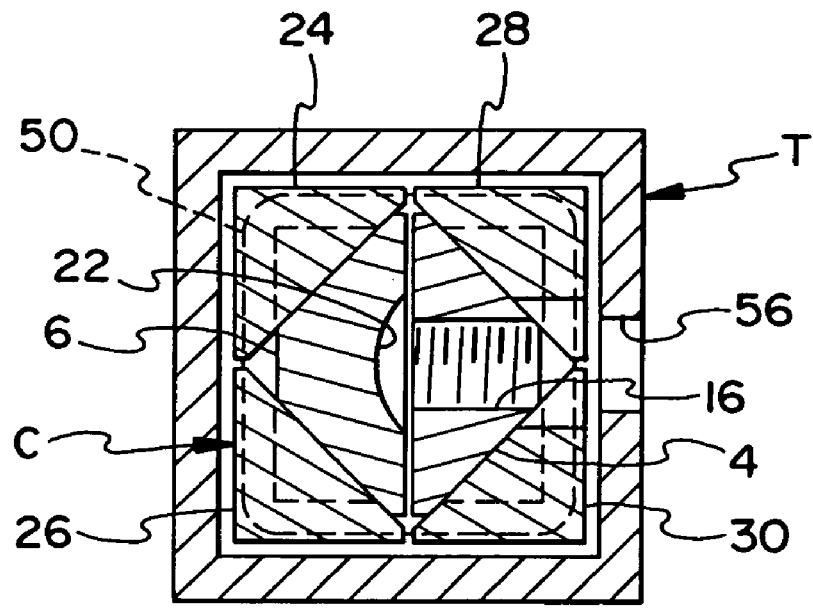
FIG. 5 is a cross-section view of the connector shown in FIG. 1 and taken along lines 5—5.
Figure 6:
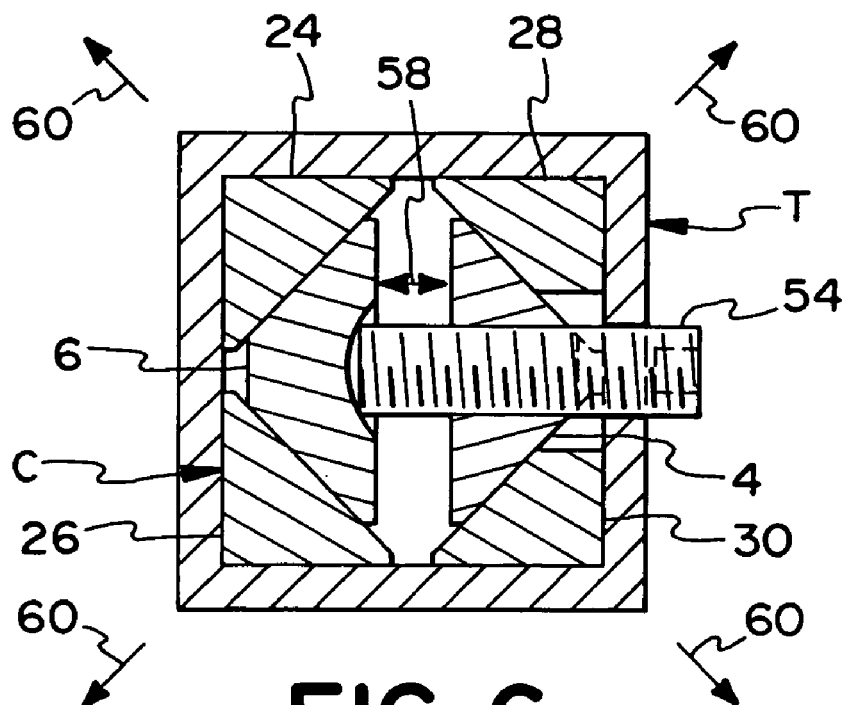
FIG. 6 is a cross-sectional view of the connector shown in FIG. 4 and taken along lines 6—6.

FIG. 1 illustrates alignment of the connector C when inserted within two adjacent sections of tubing T to be connected. Each end of tubing T is provided with a bore 56 having a size sufficient to allow one of screws 52 and 54 to pass through. FIG. 5 illustrates the position of connector C within a section of tube T before interconnection and showing a gap extending between the interior of the tube T and the outer perimeter of the connector C. FIG. 4 illustrates the connector C interconnecting two sections of tubing T. Each of screw 52 and 54 is rotated (via hex wrench H shown in FIG. 1). As the screw advances through the threaded passage 16 of cooperating member 4, an opposite end of the screw is pressed against cooperating member 6 at concave region 22 to cause separation of the cooperating members in a direction transverse to the longitudinal axis of the central body 2 and as indicated by arrow 58 in FIG. 6. Cam surfaces 8, 10, 12 and 14 simultaneously cause respective wedge members 24, 26, 28 and 30 to move outwardly and in the direction of arrows 60 shown in FIG. 6 along the entire length of the connector C. As a result, the exterior contact surfaces of each wedge member will apply pressure against the interior wall of the tubing and in a manner so as to uniformly engage the interior surface of the tubing T (FIGS. 4 and 6) to connect adjacent sections of tubing T. As is apparent, because the adjustment screws extend through a bore 56 of each tube, they provide locking engagement to the tubes that is supplemental to that provided by the wedge members against the interior of the tube. To disengage, the screw is rotated in a direction opposite to that during engagement until it is removed from the connector C and bore 56 of tubing T.

If the interior wall of the tubing becomes worn away causing the interior diameter to increase, the user increasingly expand the connector until a sufficiently rigid connection is achieved and the variance is compensated for. In addition, because the wedge members do not bite into the tube along discrete location but instead contact a large surface area of the tube, a rigid and strong connection will result.

Various modifications of the preferred embodiment described above are within the scope of the present invention. The connector may be constructed from aluminum extrusion or other metals, composites, plastics or any rigid material having properties well adapted to the end use of the structure. As is apparent, the screws may be modified to provide other than a hex head. The screws may even be replaced with another mechanism adapted to convert rotational movement to translational movement (rotary to linear) so long as the mechanism selected is adapted to move the cooperating members to move apart. While the embodiment disclosed above permits disassembly and reuse of the connected structure, the connector may be modified to remain fixed following interconnection. The O-ring may be modified so long as it continues to provide the necessary retention forces that enable the connector to expand and contract and remain assembled. Although the tubing is shown to have a square cross-section, the present invention is readily adapted for use with tubing having a circular cross-section. In that embodiment, the exterior contact surfaces of the wedge members are reshaped in a suitable manner and at least two wedge members are necessary. Other configurations of the exterior contact surfaces are within the present invention. Furthermore, the wedge members may be coextensive with the full length of the central body or modified in a manner to not extend the full length of the connector in applications where such contact with a tube would be desirable.

While this invention has been described as having a preferred design, it is understood that it is capable of still further modifications and uses and/or adaptations of the invention following in general the principle of the invention and including such departures from the present disclosure as come within the known or customary practice in the art to which the invention pertains and as may be applied to the central features hereinbefore set forth and fall within the scope of the invention or limits of the claims appended hereto.

I claim:

1. A connector for tubing comprising:
   a) a central body, said central body having a longitudinal axis extending from a first end to a second end thereof and comprising first and second cooperating members;
   b) an expansion mechanism, said expansion mechanism operatively associated with said central body for selectively moving said first and second cooperating members transverse to the longitudinal axis of said central body; and
   c) at least first and second wedge members, said wedge members surrounding said central body in an equidistant manner and resting thereagainst from about said first end to said second end so that when said first and second cooperating members are caused to be moved apart by said expansion mechanism, said wedge members will be urged outwardly from said central body along the longitudinal axis thereof to engage the interior of a tube to be connected.

2. A connector as in claim 1 and further including:
   a) third and fourth wedge members.

3. A connector as in claim 1 and further including:
   a) a retaining member, said retaining member operatively associated with each of said wedge members to maintain each of said wedge members in contact against said central body.

4. A connector as in claim 1 and further including:
   a) a recessed channel, said recessed channel extending into each of said wedge members and in a direction transverse to the longitudinal axis thereof, said retaining member received in said recessed channel.

5. A connector as in claim 3 and wherein said retainer member comprises at least one elastic O-ring.

6. A connector as in claim 1 and wherein said central body including four exterior surfaces and a generally square cross-sectional configuration, each of said first and second cooperating members including two of said four exterior surfaces.

7. A connector as in claim 2 and wherein each of said wedge members have a generally triangular cross-sectional shape so that said connector has a generally square cross-sectional configuration.

8. A connector as in claim 1 and wherein said expansion mechanism comprises at least one screw operatively associated with a threaded bore, said threaded bore extending continuously through said first cooperating member and into said second cooperating member.

9. A connector as in claim 8 and wherein said wedge members lying against said central body first cooperating member having a clearance region extending therethrough, said at least one screw adapted to extend through said clearance region.

10. A connector as in claim 8 and wherein said at least one screw having a length such that said at least one screw is adapted to extend through the wall of a tube to be connected.

11. A connector as in claim 1 and wherein said wedge members are coextensive with said first and second cooperating members.

12. A connector as in claim 1 and wherein said wedge members have a length substantially the same as the length of said first and second cooperating members.

13. A connector as in claim 6 and wherein said four exterior surfaces are cam surfaces.

14. A structural member comprising:
   a) a first length of square tubing, said first length of square tubing having an interior surface, an exterior surface, a first end, a second end and an opening extending from said interior surface to said exterior surface thereof for receiving a first expansion mechanism;
   b) a second length of square tubing, said second length of square tubing having an interior surface, an exterior surface, a first end, a second end and an opening extending from said interior surface to said exterior surface thereof to receiving a second expansion mechanism; and
   c) a connector adapted to be received within each of said first and second lengths of square tubing to interconnect the same, said connector comprising a central body having a longitudinal axis extending from a first end to a second end thereof and comprising first and second cooperating members, first and second expansion mechanism operatively associated with said central body at opposite ends thereof, said first and second expansion mechanisms for selectively moving said first and second cooperating members transverse to the longitudinal axis of said central body, at least first, second, third and fourth wedge members, said wedge members surrounding said central body in an equidistant manner and resting thereagainst from about said first end to said second end so that when said first and second cooperating members are moved thereapart by said expansion mechanism said wedge members are urged outwardly from said central body and along the longitudinal axis thereof to uniformly engage said interior surfaces of said first and second lengths of said square tubing of a tube to interconnect the same.

15. A structural member as in claim 14 and further including:
   a) two retaining members, each of said retaining members operatively associated with said wedge members to maintain said wedge members in contact against said central body.

16. A structural member as in claim 14 and wherein said central body having four exterior cam surfaces and a generally square cross-sectional configuration, each of said first and second cooperating members including two of said four exterior cam surfaces.

17. A structural member as in claim 14 and wherein each of said wedge members has a generally triangular cross-sectional shape so that said connector has a generally square cross-sectional configuration.

18. A structural member as in claim 14 and wherein each of said first and second expansion mechanisms comprise at least one screw operatively associated with a threaded bore, said threaded bore extending continuously through said first cooperating member and into said second cooperating member, said at least one screw member adapted to be received within one of said openings of said first and second and second lengths of square tubing.

19. A structural member as in claim 18 and wherein said at least one screw having a length such that said at least one screw is adapted to extend through one of said openings of said first and second lengths of square tubing.

20. A structural member as in claim 14 and wherein said wedge members are coextensive with said first and second cooperating members.

\* \* \* \* \*